United States Patent
Zhang et al.

(10) Patent No.: US 9,609,703 B2
(45) Date of Patent: Mar. 28, 2017

(54) METHOD OF CONTROLLING A LIGHTING ARRANGEMENT, A LIGHTING CONTROLLER AND A LIGHTING SYSTEM

(71) Applicant: PHILIPS LIGHTING HOLDING B.V., Eindhoven (NL)

(72) Inventors: Xianhui Zhang, Shanghai (CN); Marco Haverlag, Mierlo (NL); Jie Fu, Shanghai (CN); Shan Wang, Shanghai (CN); Shu Xu, Shanghai (CN); Peter Alexander Duine, Eindhoven (NL); Herman Johannes Gertrudis Gielen, Valkenswaard (NL); Junhu Liu, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/908,139

(22) PCT Filed: Nov. 6, 2014

(86) PCT No.: PCT/EP2014/073853
§ 371 (c)(1),
(2) Date: Jan. 28, 2016

(87) PCT Pub. No.: WO2015/074881
PCT Pub. Date: May 28, 2015

(65) Prior Publication Data
US 2016/0255687 A1    Sep. 1, 2016

(30) Foreign Application Priority Data

Nov. 25, 2013 (WO) ............... PCT/CN2013/001437
Jan. 24, 2014 (EP) ..................................... 14152510

(51) Int. Cl.
H05B 37/02 (2006.01)
H05B 33/08 (2006.01)

(52) U.S. Cl.
CPC ..... *H05B 33/0815* (2013.01); *H05B 33/0818* (2013.01); *H05B 33/0827* (2013.01);
(Continued)

(58) Field of Classification Search
CPC ............ H05B 33/0815; H05B 33/0818; H05B 33/0845; H05B 33/0857; H05B 37/0281; H05B 37/0254
(Continued)

(56) References Cited

U.S. PATENT DOCUMENTS 4,257,029 A * 3/1981 Stevens ................. G08G 1/081
340/4.21
4,370,718 A * 1/1983 Chasek .................... G08G 1/08
340/911
(Continued)

FOREIGN PATENT DOCUMENTS

CN           1668157 A     9/2005
CN         102469665 A     5/2012
(Continued)

*Primary Examiner* — Douglas W Owens
*Assistant Examiner* — Syed M Kaiser

(57) ABSTRACT

A lighting controller and method has light sources which are activated for a respective lighting duration in a repeating non-overlapping sequence. The end of the lighting duration for one light source is detected for triggering the switching on of the next light source in the sequence. This provides non-overlapping control of the light sources and provides an efficient and easy to implement the required controller.

15 Claims, 7 Drawing Sheets

(52) U.S. Cl.
CPC ..... *H05B 33/0845* (2013.01); *H05B 33/0857* (2013.01); *H05B 37/0281* (2013.01); *Y02B 20/346* (2013.01)

(58) Field of Classification Search
USPC .................. 315/210, 294, 360, 224, 307
See application file for complete search history.

(56) References Cited

U.S. PATENT DOCUMENTS

| | | | |
|---|---|---|---|
| 5,943,086 A * | 8/1999 | Watabe | H04N 1/053 250/206 |
| 6,191,818 B1 * | 2/2001 | Koizumi | H04N 5/232 348/207.99 |
| 7,604,378 B2 * | 10/2009 | Wolf | A01M 1/2083 362/227 |
| 7,843,148 B2 | 11/2010 | Gater | |
| 2005/0242752 A1 | 11/2005 | Lyle | |
| 2007/0296686 A1 * | 12/2007 | Yoo | G09G 3/3413 345/102 |
| 2009/0225020 A1 | 9/2009 | Ran | |
| 2009/0273282 A1 * | 11/2009 | Ballard | B60Q 1/2607 315/77 |
| 2010/0134283 A1 * | 6/2010 | Chadwell | G09F 13/04 340/540 |
| 2010/0301764 A1 * | 12/2010 | Liu | H05B 33/0818 315/250 |
| 2010/0320928 A1 | 12/2010 | Kaihotsu | |
| 2011/0080099 A1 | 4/2011 | Teng | |
| 2012/0081009 A1 * | 4/2012 | Shteynberg | H05B 33/083 315/122 |
| 2012/0146540 A1 * | 6/2012 | Khayat | H05B 33/0815 315/291 |
| 2012/0223648 A1 | 9/2012 | Jin et al. | |
| 2013/0278149 A1 | 10/2013 | Van Kaathoven et al. | |

FOREIGN PATENT DOCUMENTS

| | | |
|---|---|---|
| EP | 2461651 A2 | 6/2012 |
| GB | 2346004 A | 7/2000 |
| JP | 11119733 A | 4/1999 |
| JP | 2008210588 A | 9/2008 |
| JP | 2010021008 A | 1/2010 |
| JP | 2010139543 A | 6/2010 |
| JP | 2010521790 A | 6/2010 |
| JP | 2013069448 A | 4/2013 |

\* cited by examiner

METHOD OF CONTROLLING A LIGHTING ARRANGEMENT, A LIGHTING CONTROLLER AND A LIGHTING SYSTEM

CROSS-REFERENCE TO PRIOR APPLICATIONS

This application is the U.S. National Phase application under 35 U.S.C. §371 of International Application No. PCT/EP2014/073853, filed on Nov. 6, 2014, which claims the benefit of European Patent Application No. 14152510.5, filed on Jan. 24, 2014 and PCT/CN2013/001437 filed on Nov. 25, 2013. These applications are hereby incorporated by reference herein.

FIELD OF THE INVENTION

This invention relates to the control of lighting systems, in particular multi-channel light systems. The multiple channels can for example provide colour mixing and colour temperature control, although other effects can also be obtained by using multiple independently controllable light sources.

BACKGROUND OF THE INVENTION

Current multi-channel LED light sources, such as the Philips system known as "intelligent TLED", face a major problem of limited space assigned for drivers. This system generates white light by driving red, green and blue LEDs independently. In practice, the green LED makes use of a native blue LED and a green phosphor layer. This system generates warm white light with a very high efficiency. In addition multi-channel LED drivers are also encountered in LED modules or LED luminaries in which different channels are used to generate separate beams for general lighting and task lighting, or where separate LED strings are used to generate cold white or warm white from a single luminaire.

In current systems, the system requires separate drivers for the different LEDs of the module. A problem arises because the available space for the light source drivers is fixed to meet the requirements of traditional light sources, which normally comprise one or at most two channels, with limited functions such as a dimming function. Multi-channel light sources with WW/CW, RGB or more channels have a total peak power as well as a total space consumption which is the combination of the requirements for each channel. In order to compress the driver into a small space, basic performance has to be sacrificed, such as the power factor or efficiency, but this is generally not acceptable to the product designer. There is therefore a need to enable miniaturisation of the driver circuits, without compromising the system performance.

In general, in a multi-channel system, each channel does not always run at maximum power. In many situations, pulse width modulation (PWM) is used to control the power on one channel, meaning that the power on that channel is only drawn during a certain fraction of the time. Therefore, the total maximum power at any particular time is derived from the superposition of the peak power on each channel, when they overlap at the same time.

FIG. 1 shows a conventional multi-channel lighting system driver circuit. Three LED loads 10,11,12 are shown, which may for example have three different colour outputs. Each is driven by a respective driver 20,21,22 which essentially comprises a switch mode power supply (SMPS) or linear driver which implements PWM control. There is a global AC-DC converter 14, which includes power factor correction, and a global controller 16 which is remote to the actual light sources themselves. The global controller 16 provides commands to the local drivers 20,21,22 to control the operation of the LED loads.

The embodiments of the invention relates in particular to the control of the individual drivers 20,21,22.

The known control method is described with reference to FIG. 2, which shows the timing of current being drawn by the three LED loads, named "channel 1", "channel 2" and "channel 3".

Each channel uses PWM signal control of the LED load, with the same PWM cycle frequency. At the start of each PWM cycle, each channel starts with a high pulse, the duration of which determines the light output. Thus, all three channels are activated at the same time giving a high power demand at the beginning of each PWM cycle.

For each channel, the maximum power is for example 15W. The control method above gives a total power of 45 W. The output power swing is from 0 Watts to 45 Watts with four possible values of 45 W, 30 W, 15 W, 0 W.

There are three well known ways to ensure sufficient peak power can be delivered:

(i) Use a large output power supply. This may not physically fit.

(ii) Use a high crossover frequency power supply 14, and add a large output capacitor. The AC-DC crossover frequency can for example be around 1 kHz, so that a capacitor can be used to supply 1 ms of additional power dissipation. This approach however reduces the power factor and is not acceptable for mass production of LED systems.

(iii) Use a low crossover frequency power supply to improve the power factor and add a much larger output capacitor. If many LEDs in parallel are assembled inside the luminaire, the power factor must for example be higher than 0.9. In many applications the requirement for the Total Harmonic Distortion (THD) is below 20%. The power factor stage and DC-DC converter stage are typically combined together, and the cross frequency then needs to be below 20 Hz in order to achieve a sufficiently high Power Factor. This means a large capacitor is needed to supply 50 ms of additional power dissipation. In this case, the capacitor can be too large to be installed in the unit.

If the overlap of power supply to each channel can be avoided, the peak power will be derived from the highest peak current in the individual channels. In this case, the total peak power can be greatly reduced, giving space and cost savings for the drivers.

The idea of avoiding overlap of the driving of LEDs has been considered, for example in US 2010/0301764. This document discloses a phase shift method for implementing non-overlapping signals. The individual channels each comprise a delayed version of an input PWM signal with the same duty cycle. In this document, a delay locked loop (DLL) calculates a pulse width of the input PWM signal by a high frequency clock signal (sampling frequency), and generates for each channel a respective phase-shifted PWM signal with the same pulse width but shifted in time by such width. More specifically, it has "the PW mirror duplicates and delays a received PWM signal". A turn-ON timing of each of the multiple phase-shifted PWM signals follows a turn-OFF timing of a previous PWM signal which is the input PWM signal or a previous one of the multiple phase-shifted PWM signals. Particularly, in FIG. 8B and para [0040], the edge detector 201 detects a rising and/or a falling edge of the received PWM signal. and a pulse width memory circuit 202 memorizes the pulse width of the received PWM signal.

SUMMARY OF THE INVENTION

In US 2010/0301764, a drawback is that an input PWM signal is necessary for each of these channels to duplicate. Another drawback is due to the duplication of the input PWM signal, the duty cycles of these channels are all the same, which makes some output characteristic such as the colour mixing and colour temperature adjustment impossible.

Another prior art is US2007/0296686A1 discloses driving backlight of liquid crystal display. When the backlight type is the direct type, as shown in FIG. 1a, the angle by which each of the phases of the red, green, and blue pulse width modulation signals PWM_R, PWM_G, and PWM_B shifted is set by a calculation based on minimizing overlapping portions among the red, green, and blue pulse width modulation signals PWM_R, PWM_G, and PWM_B", "the pulse width modulation signal PWM_R for red is output like the related art, the pulse width modulation signal PWM_G for green is delayed by about 120° and then output, and the pulse width modulation signal PWM_B for blue is delayed by about 240° and then output." Thus it can be understood that this prior art only calculates the phase offset between different colors, and start the next color when the offset was reached.

Therefore it is advantageous to guarantee the non-overlapping functionality. It is also advantageous to have a low cost solution. It is still further advantageous to eliminate the need of a global reference/clock signal and also enable the adjustable output characteristic, such as colour mixing and colour temperature adjustment.

To address at least one of the above concerns, the invention is defined by the claims.

According to the invention, there is provided a method of controlling a lighting arrangement comprising a set of at least two light sources, the method comprising:

switching on each light source for a respective lighting duration in a repeating non-overlapping sequence; and detecting the end of the lighting duration for one light source and using the detected end of the lighting duration for one light source as a timing trigger for switching on the next light source in the sequence;

wherein the controller further comprises an adjustment interface, adapted to receive information about lengths of the durations, and wherein the controller is adapted to independently and individually configure each of the durations according to the received information.

This method provides the activation of light sources in a non-overlapping sequence by detecting the end of one lighting time period and using this as a trigger for the next, so that the power requirement is kept to a minimum and overlapping is guaranteed. The embodiment of the invention enables the light source control signals to be provided in a simple manner. For example, in some implementations a global clock signal is not need to control the next light duration. Thus the cost is decreased since low end processor/circuit is capable of this operation.

The embodiment of the invention also enables the lighting arrangement to be used at its maximum output given the constraint of non-overlapping control signals. In particular, no matter what relative durations are desired for the different light sources (for example to achieve a given colour output), they can be made to fill the time available. For example with three light sources, they do not need to be constrained to occupy only up to one third of the period of the full sequence. This may help for shortening a dark duration wherein no light source is on thus decreasing the ripple/flicker. By minimising peak power, the components required for the driver design can be downgraded with benefit of cost savings, size reductions, power factor improvement, and efficiency improvement, which are critical to lighting product development.

In one example, at the end of the lighting duration for one light source, the next light source in the sequence is switched on, such that the lighting durations together cover each period of time during which the lighting arrangement is controlled.

This approach provides the activation as a continuous non-overlapping sequence. The contribution of the different light sources can be controlled by varying the relative durations of the different light source signals. This example enables the light source control signals to be provided in a simple manner. For example, in some implementations the last light duration in one cycle can trigger the first light duration in the next cycle, thus a global clock signal is not need to control the repeating cycle. This may help for eliminating the dark duration wherein no light source is on thus decreasing the ripple/flicker.

In another example, at the end of the lighting duration for each of at least one of the light sources, a control duration is triggered on by the end of the lighting duration for said at least one light source before the next light source in the sequence is switched on, and the end of the control duration is used as a timing trigger for switching on the next light source in the sequence, and the lighting durations for the light sources and the control duration or durations together cover each period of time during which the lighting arrangement is controlled;

wherein the control duration is a blank channel which does not result in any light output.

This approach provides the activation as a continuous non-overlapping sequence with a control duration period between one or more pairs of light source lighting durations. This control duration can be used to adjust the practical lighting output from the real lighting sources. For example, the control duration can be used to define a period of no light output, in other words, not related to any of the real light sources. The control duration thus introduces a delay between the end of one light source output and the start of the next one in the cycle. For example, after the last light source in the sequence is activated, there can be a control delay before the first is re-activated. In this way, the system is operated below full light output and the total output lumen can be adjusted, and this thus provides a dimming control function dependent on the duration of the delay.

In one configuration, the lighting durations for at least two light sources are in succession, and the control duration is triggered at the end of the successive lighting durations of the at least two light sources. The control duration is thus only after every two or more lighting durations, for example only after the full sequence. Since control channels are few, this solution is simple to realize. In another configuration, a respective control duration is triggered at the end of the lighting duration for each of the light sources. This approach provides the activation as a continuous non-overlapping sequence with a control duration between each pair of lighting durations. In this way, the system again is operated below full light output, and the control delays are spread over time and thus the dark duration between each light duration is short, helping to reduce flicker and ripple.

In all examples, the end of one lighting duration is used to trigger the next. As will be apparent from the various examples above, the trigger may be immediate or delayed by a control duration. Thus, the term "used as a timing trigger" should be understood accordingly.

The time durations (lighting durations and control duration or durations) are preferably independently and individually selectable.

The method can be for controlling a system comprising a set of three light sources giving different and adjustable colour mixing and colour temperature outputs, the method thereby providing colour point control. The system can comprise a set of LED arrangements.

The invention also provides a lighting controller for controlling a lighting arrangement comprising a set of at least two light sources, the controller comprising:

a timing unit for controlling the timing of operation of the light sources in a repeating non-overlapping sequence, wherein the timing unit is adapted to switch on each light source for a respective lighting duration, wherein the timing unit further comprises a detection subunit adapted to detect the end of the lighting duration for one light source and the timing unit is adapted to use the detected end of the lighting duration as a timing trigger for switching on the next light source in the sequence.

This controller implements the method of the invention.

In one embodiment, the timing unit comprises:

a processor adapted to generate respective output signals for each of the durations, wherein the processor is further adapted to detect the trailing edge of one output signal corresponding to a first duration and, when the trailing edge is detected, to trigger another output signal corresponding to a second duration succeeding the first duration in the sequence.

This detection of the processor output signals functions as a feedback approach for generating sequence of timing signals (lighting duration and control duration signals if used). This means that the sequence can be triggered by a start pulse, and the feedback approach then avoids the need for further timing of the overall cycles. In this way, feedback is used to relax the requirement for accurate timing of the control cycles, because the timing is controlled by feedback of the signals themselves. This provides a more direct triggering approach. Another advantage is that current low price commercial microprocessors/MCUs have this capability of detecting the trailing edge of its output, thus the cost to realize the embodiment is low. By comparison, if the trailing edge trigger solution is not used, but a microcontroller (MCU) is instead used to generate non-overlapping control signal by referring to the MCU's own clock, the MCU needs to be a high end device which has a higher cost.

In another embodiment, the timing unit comprises:

a processor adapted to generate output signals for each of the lighting durations, wherein the output signals are on simultaneously but off at the end of the respective lighting durations;

a set of one or more logic circuits, each circuit comprising:

a first input for receiving a signal corresponding to a first duration from a corresponding output of the processor;

a second input for receiving a signal corresponding to a second duration to be triggered by the end of the first duration from a corresponding output of the processor, wherein at least said second duration is a lighting duration;

a logic operation module for calculating a logic result based on the signals corresponding to the first duration and the second duration, said logic result comprising the logic AND between the signal corresponding to the second duration and an inversion of the signal corresponding to the first duration; and an output for outputting said logic result as control signal to a corresponding one of the light sources.

In this embodiment, the different waveforms can be generated simply, all starting at the beginning of a periodic cycle, but ending at the desired end time of each lighting duration. Each logic circuit then coverts a pair of these overlapping signals into a desired non-overlapping signal. The logic circuit function thus makes use of the waveform transitions as trigger points, and thus implements the detection function. The advantage of this embodiment is it is relatively simple for a low end microprocessor/microcontroller to generate multiple signals with a simultaneous starting point and different ending point. Thus the cost to realize the embodiment is low.

The controller can further comprise an adjustment interface, adapted to receive information about lengths of the durations (i. e. the lighting durations and the control durations if they are used), and the controller is adapted to independently and individually configure each of the durations according to the received information.

The invention also provides a lighting system comprising:

a lighting arrangement comprising a set of light sources; and a controller of the invention for controlling the lighting arrangement.

In one embodiment, said lighting arrangement comprises a set of drivers, each of which being adapted to drive one of said set of light sources respectively, and wherein said set of drivers is controlled by said controller to operate in the non-overlapping sequence.

This embodiment provides one implementation about how the drivers are configured. There is a specific driver for each light source and the drivers are controlled in the non-overlapping sequence.

In an alternative embodiment, said lighting arrangement comprises a driver;

a set of switches, wherein the input of each switch is coupled to said driver and the output of each switch is coupled to one of said set of light sources respectively, and said set of switches is controlled by said controller to be conductive in the non-overlapping sequence.

This embodiment provides another implementation. There is only one single driver, and a set of switches, in the form of a switch box e.g., is provided to switch the single driver to each of the light source in the non-overlapping sequence. The advantage is simple and even lower cost than the embodiments in which each channel still has its own current source.

In an embodiment, the lighting arrangement comprises a set of three light sources giving different colour outputs, wherein the light sources each comprise an LED arrangement.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

In the figures, the same or similar reference signs stand for the same or similar components/steps.

DETAILED DESCRIPTION OF THE EMBODIMENTS

The invention provides a lighting controller and method in which light sources are activated for a respective time duration in a repeating non-overlapping sequence. The end of the time duration for one light source is detected to trigger the switching on of the next light source in the sequence. This provides non-overlapping control of the light sources and provides an efficient and easy to implement the required controller.

The examples below are all based on a lighting arrangement of three light sources. However, the invention can be applied to two light sources or more than three. Each light source can comprise a single LED or a cluster of LEDs. Furthermore, the invention is not limited to LEDs, and the same concept can be applied to other light source devices. The invention is however of particular interest for LED lighting systems with two or more channels and where there is limited space for drivers such as for linear light sources.

Each channel triggers the next channel, and because a repeating sequence is defined, the last channel in one cycle triggers the first channel in the next cycle. By providing no overlap between channels, in each cycle the peak power is equal to the maximum peak power of the individual channels. The peak power can therefore be limited, resulting in a low power requirement for the AC-DC drivers to reduce space requirements.

Figure 3:
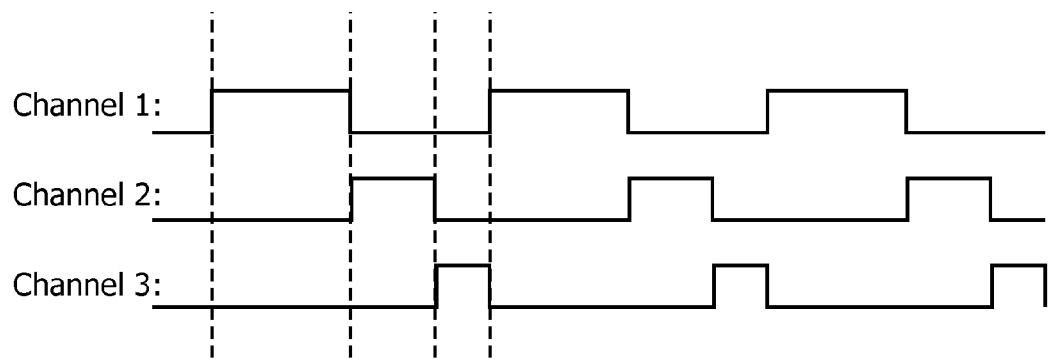
FIG. 3 shows a first example of timing diagram implementing a method of the invention.

FIG. 3 shows a first example of timing diagram implementing a method of the invention.

In this example, the end of the lighting duration of channel 1 is detected and triggers the start of the lighting signal of channel 2. The end of the lighting duration of channel 2 is detected and triggers channel 3, then the end of the lighting duration of channel 3 is detected and triggers channel 1 to start a new cycle of the repeating sequence.

To control the channels, only a start command to start channel 1 is needed. No other reference timing signal is needed. The duty cycles or the time duration of ON for each channel can be pre-set. Thus each channel, after being triggered, is switched on for that pre-set duration and then switched off. Thus operation is a simple operation that can be done by any microprocessor/microcontroller, including low end/cost versions.

The example of FIG. 3 shows a total duty for one cycle of 1 so that the activated lighting durations together cover each the time period during which the lighting arrangement is controlled. The lighting system will typically be controlled for successive periods of time. Each period of time is effectively when the lighting system is turned on and delivering a desired light output.

The different channels are typically for different colours, and the different duty cycles for the different colours thus implement colour point control and colour temperature control. It will be apparent from the timing diagram of FIG. 3 that every channel duty ratio can be selected independently.

In the example of FIG. 3, channel 1 has a 50% duty cycle for example for a red LED, channel 2 has a 30% duty cycle for example for a green LED, and channel 3 has a 20% duty cycle for example for a blue LED.

This arrangement operates at full output power. Furthermore, since at any time, one channel is on, the flicker/ripple is reduced.

Figure 4:
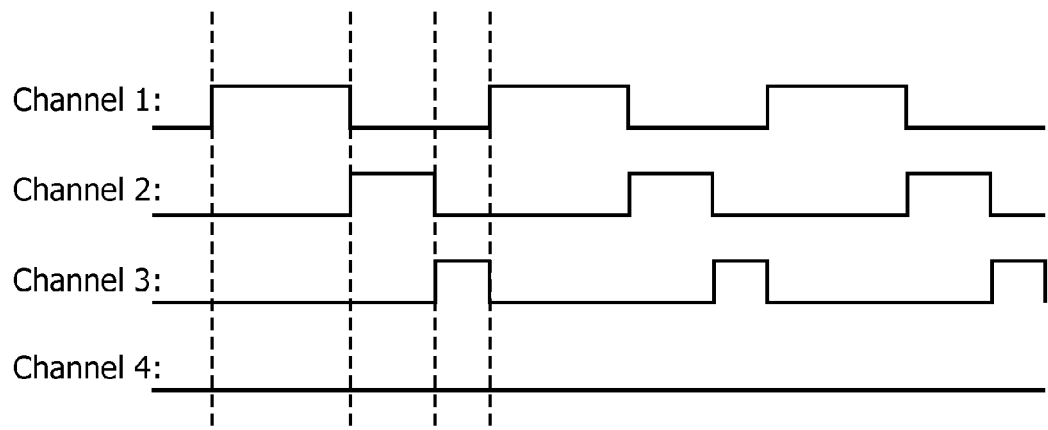
FIG. 4 shows a second example of timing diagram implementing a method of the invention.

It is also possible to implement additional control, such as dimming control. For this purpose, an extra control channel can be added, as shown in FIG. 4 as channel 4. In dimming control, this channel is a blank channel which does not result in any light output, for example used to control a dimming function. This blank channel is used for dimming out all light sources for a certain duration and also for triggering the light source ON again. In FIG. 4 the control duration is zero.

Figure 5:
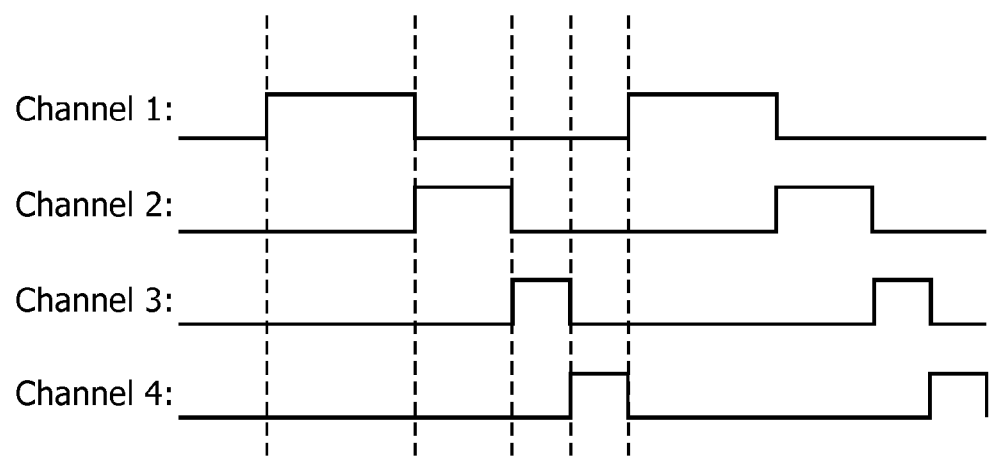
FIG. 5 shows a third example of timing diagram implementing a method of the invention.

The way this extra control channel can be used to provide dimming control is shown in FIG. 5.

In this arrangement, detection of the end of channel 3 triggers the start of an ON duration/pulse in the control channel 4, and the detection of the end of the control channel ON duration then triggers channel 1 again and starts a new lighting cycle period.

The control channel 4 has a desired control duration. It can therefore be processed in the same way as the durations which define the lighting durations, and thus can simply be processed as an extra lighting channel even though it is an effectively blank channel. The end of the control duration is detected as a further timing trigger, in the same way that the end of each of the lighting durations is detected and functions as a timing trigger.

This means that at the end of the lighting duration for a selected one of the light sources (channel 3 in this case), the next light source in the sequence (channel 1 in this case) is switched on after an intervening control duration. This control duration thus introduces a time delay during which no light source is activated. This time delay is the duration of the control duration on channel 4. In this case, the lighting durations and the control duration on channel 4 together cover all of the time during which the lighting arrangement is controlled.

For example, for a 90% power/light output, channel 4 can have a 10% duty cycle. To give the same colour point as the example of FIG. 3, channel 1 has a duty cycle of (1−10%)*50%=45%, channel 2 has a duty cycle of (1−10%)*30%=27% and channel 3 has a duty cycle of (1−10%)*20%=18%.

Figure 6:
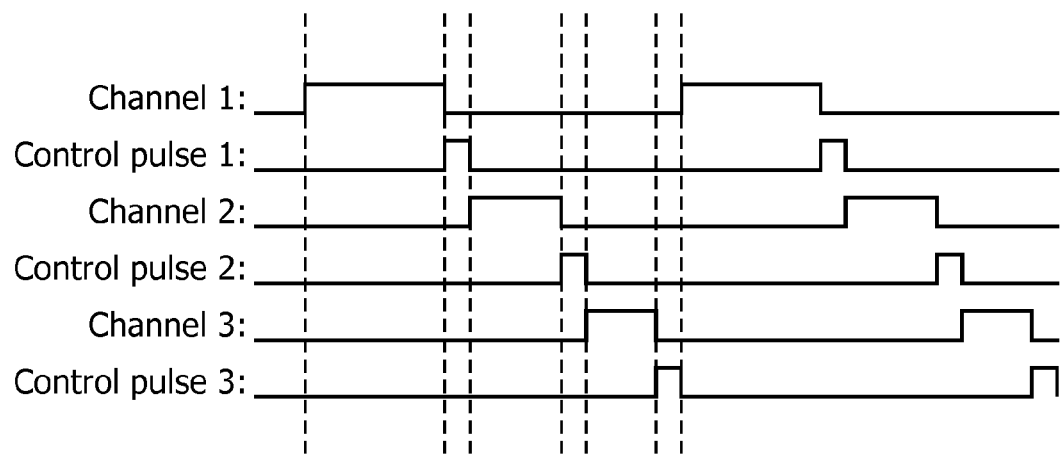
FIG. 6 shows a fourth example of timing diagram implementing a method of the invention.

In order to reduce the ripple/flicker of output, this blank control channel can be further divided into multiple short blank control channels distributed among the lighting time periods of multiple LED channels. This prevents a long dark duration and ripple/flicker is reduced. This approach is shown in FIG. 6. In this case, at the end of the time duration for one light source, the next light source in the sequence is switched on after a respective control duration. The lighting time durations and multiple control durations again cover all of the time period during which the lighting arrangement is controlled. Each individual control duration is the division of the desired overall off period (e.g. 10% from the example above) by the number of real light channels (e.g. 3 in the present embodiment).

Examples have been given of a single control pulse duration in each cycle, or a number of control duration delays corresponding to the number of channels. The delay may be split into a different number, such as every 2nd or 3rd light source channel. Thus, in general, for each of at least one of the light sources, a control duration is triggered on by the end of the lighting duration for that light source, before the next light source in the sequence is switched on.

In the above embodiment, the control channel is not related to any lighting source to provide dimming. But the control channel is not limited as such. The control channel can be related to other functionality to realize other technical effect. For example, in a more specific embodiment, the control channel can be selectively related to one of the lighting channels to provide compensation in colour mixing. Those skilled in the art would design other solutions by using the control duration to solve their technical problems, and these solutions also fall within the scope of the invention.

Figure 7:
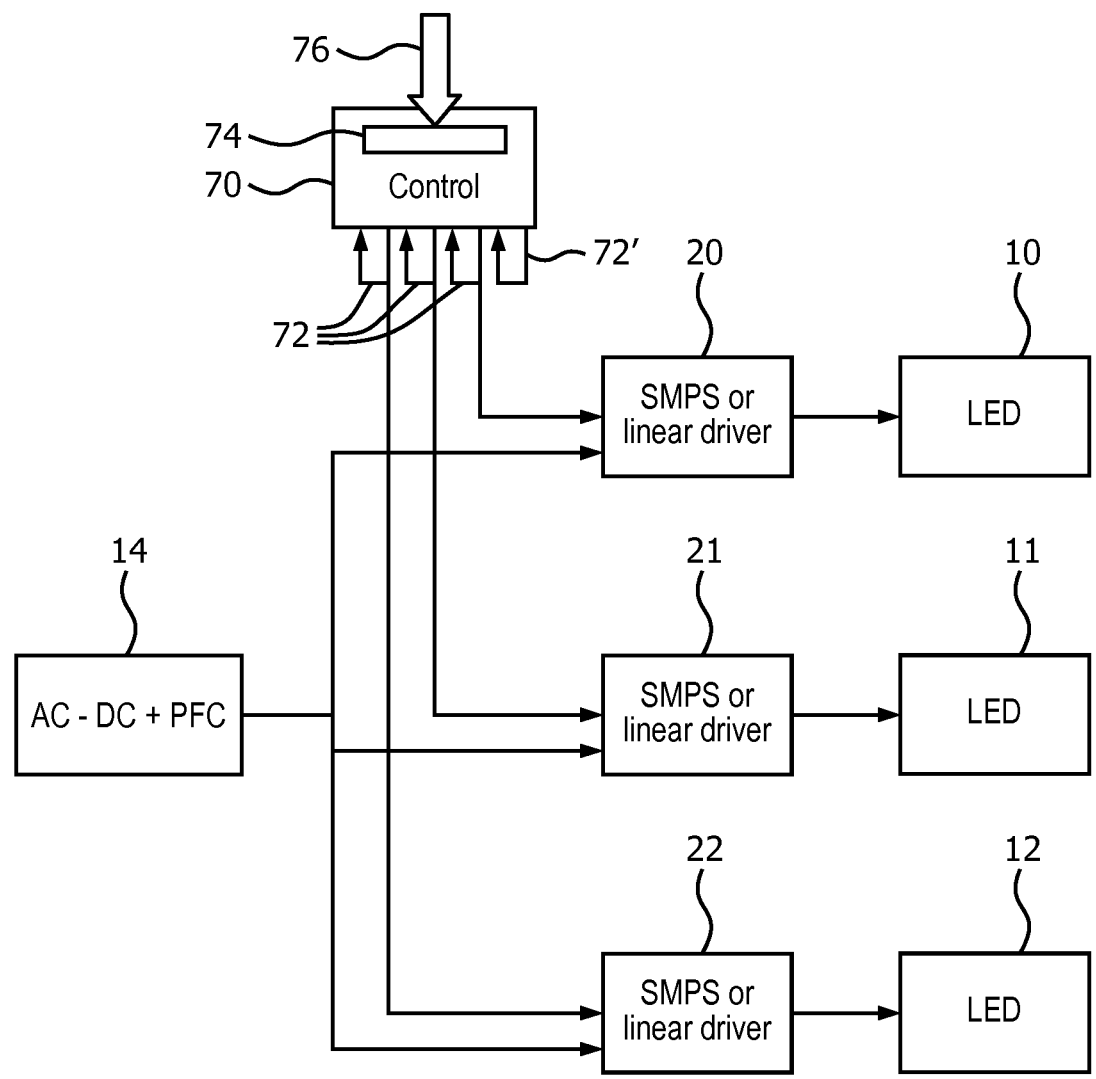
FIG. 7 shows a first example of lighting system of the invention.

FIG. 7 shows a first example of lighting system of the invention. The lighting arrangement comprises a set of drivers 20, 21 and 22, each of which being adapted to drive one of said set of light sources 10, 11 and 12 respectively, and wherein said set of drivers 20, 21 and 22 is controlled by controller to operate in the non-overlapping sequence.

Figure 1:
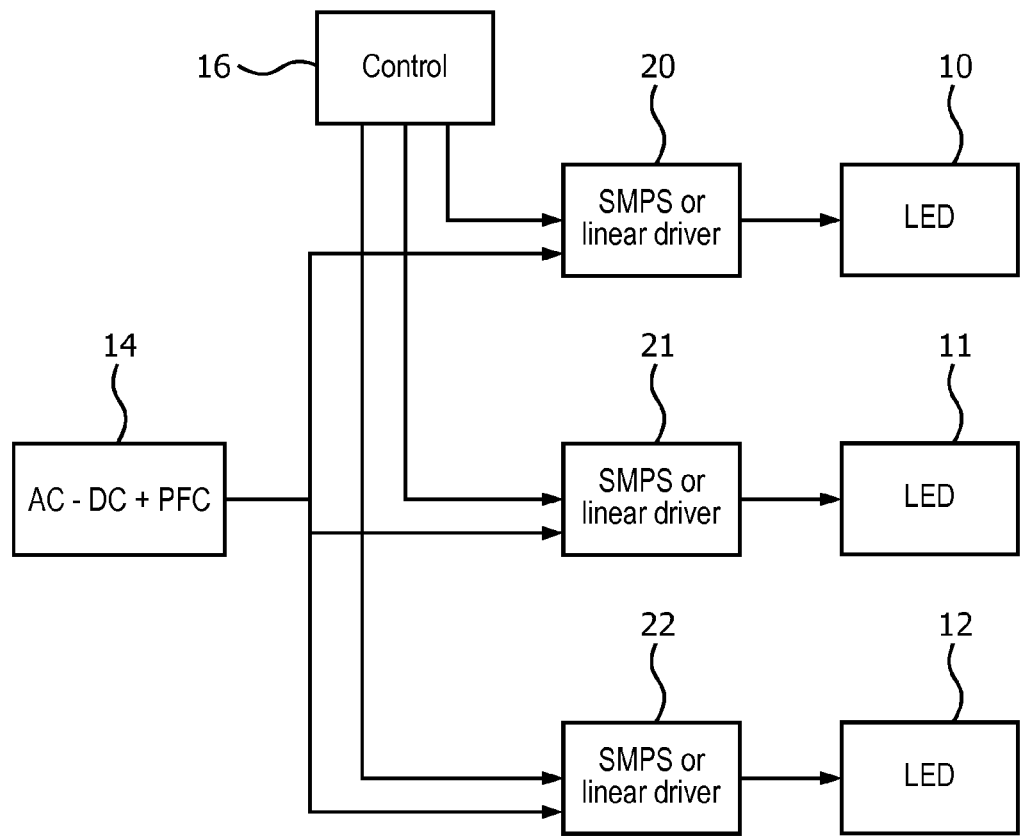
FIG. 1 shows a known lighting system.
Figure 2:
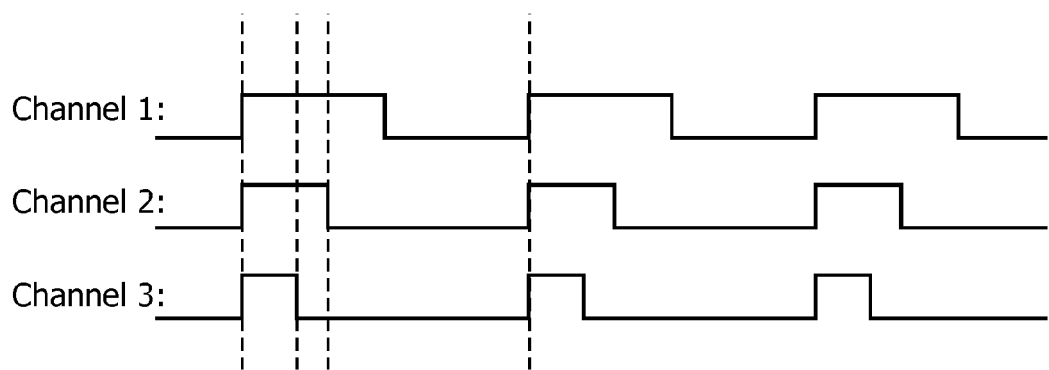
FIG. 2 shows a timing diagram for the known system of FIG. 1.

The same components as in FIG. 1 are given the same reference numbers. The difference resides in the global (remote) controller 70. Instead of synchronising the PWM signals for each channel with a master clocked reference signal, the timing is achieved based on feedback of the channel signals. The controller simply applies a set duration to each channel after triggered to do so by the feedback signals, which are the outputs of the system. The controller 70 thus implements detection of the trailing end of each of the lighting durations as well as implementing timing of the lighting durations. This feedback is represented in simple form in FIG. 7 by the arrows 72.

The controller 70 thus comprises a timing unit, and a detection subunit (which can be considered as part of the timing unit). Within the timing unit, the repeating sequence waveforms are used as feedback control inputs to provide timing triggers which the timing unit uses as inputs.

The controller thus generates respective output signals for each of the durations, and by using the feedback shown, the controller is adapted to detect the trailing edge of one output signal corresponding to a first duration and, when the trailing edge is detected, to trigger another output signal corresponding to a second duration succeeding the first duration in the sequence. In FIG. 7, three output signals are shown for the three light sources. A fourth control channel is also used as a feedback input as explained above and as shown by arrow 72'. Physically, the port of this channel can be entirely internal within the controller 70, or is an output port but isolated from other components, since it is a blank channel not needed as a real output to the driver. In case of using the control channel for other functionality, the port of this control channel can be connected to other components.

The controller 70 further comprises an adjustment interface 74, which receives information 76 about the desired lengths of the lighting durations (e.g. for colour point control) and the control duration or durations (e.g. for dimming control), and the controller 70 can independently and individually configure each of the durations according to the received information.

Figure 8:
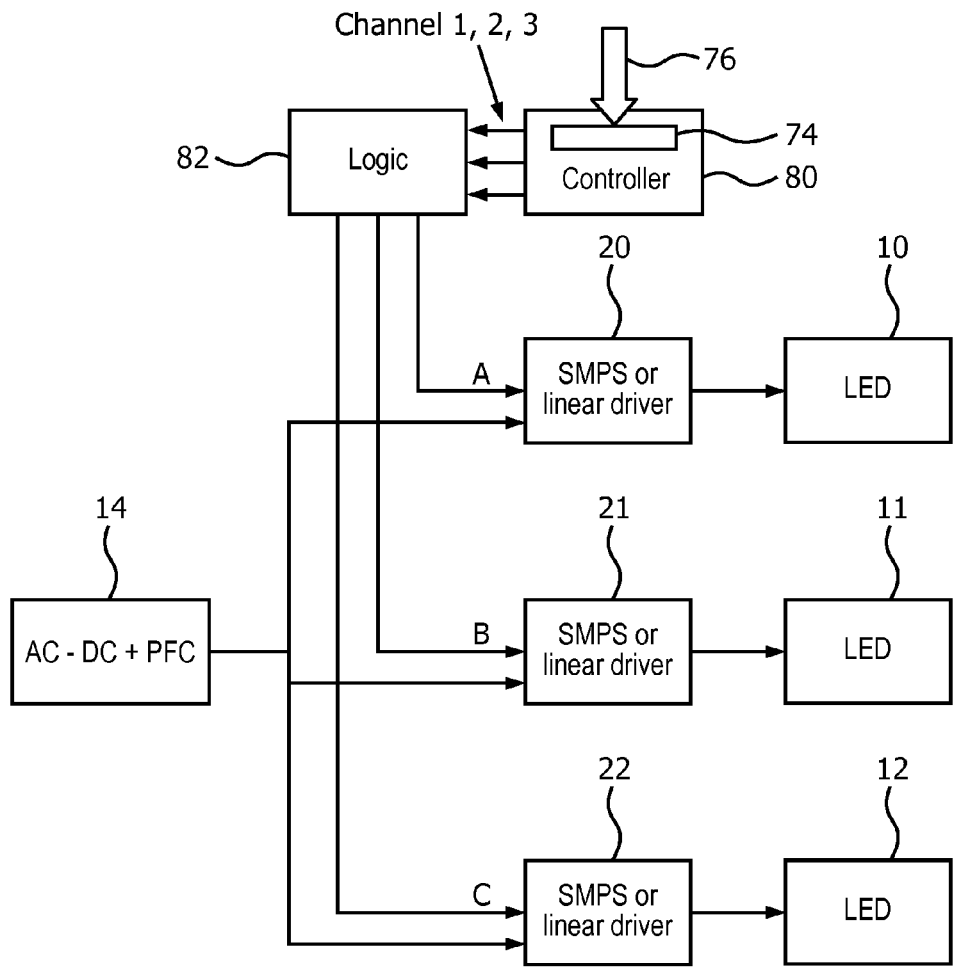
FIG. 8 shows a second example of lighting system of the invention.

FIG. 8 shows a second example of lighting system of the invention. The same components as in FIGS. 1 and 7 are again given the same reference numbers. The difference resides in the global (remote) controller 80 and also the addition of a logic gate arrangement 82.

Figure 9:
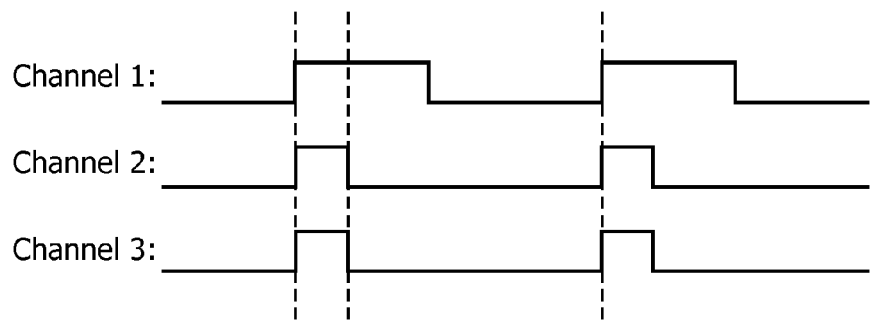
FIG. 9 shows a timing diagram giving the timing signals in conventional format.

FIG. 9 shows a timing diagram giving the desired timing signals in conventional overlapping format. This example is based on channel 1 with a 50% duty cycle (red LED), channel 2 with a 15% duty cycle (green LED) and channel 3 with a 15% duty cycle (blue LED). This leaves a 20% duty cycle blank. This set of signals thus gives an 80% output power at a specific colour point.

Figure 10:
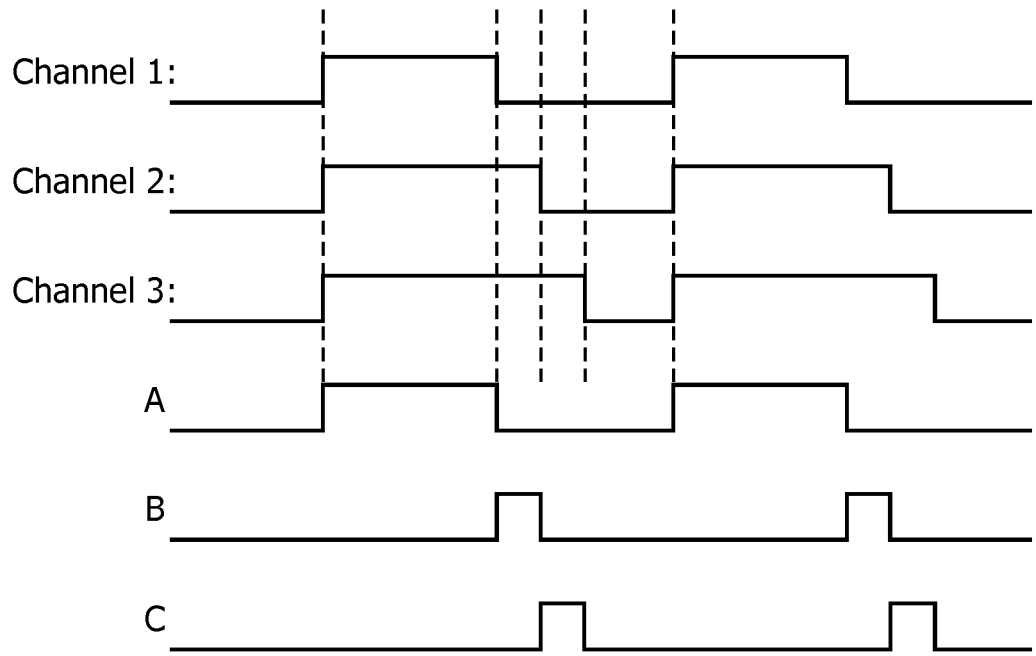
FIG. 10 shows a timing diagram for the system of FIG. 8 for the signals output by the main controller and the desired non-overlapping signals.

Instead of generating the signals shown in FIG. 9, the controller 80 provides cumulative signals as shown by the top three plots in FIG. 10. In general, the controller generates output signals for each of the lighting durations, wherein the output signals are ON simultaneously at the start of the cycle but off at the end of the respective lighting durations. Under this criteria, the duration of the lighting pulse for channel 1 is unchanged. The duration of the lighting pulse for channel 2 is equal to the durations for channel 1+channel 2, and the duration of the lighting pulse for channel 3 is equal to channel 1+channel 2+channel 3. This gives channel 1 a 50% duty cycle, channel 2 a 65% duty cycle and channel 3 an 80% duty cycle.

As will be understood from the following, there is no need for a control channel in this case, since the control duration is simply defined as the remaining time duration in the period after all the lighting pulses have been elapsed. It should be understood that a control duration or multiple control durations can however also be used for this embodiment.

By providing these cumulative signals, there is a set of transitions (with dotted lines in FIG. 10) which can be processed as logic control input to generate the desired set of non-overlapping pulses.

Figure 11:
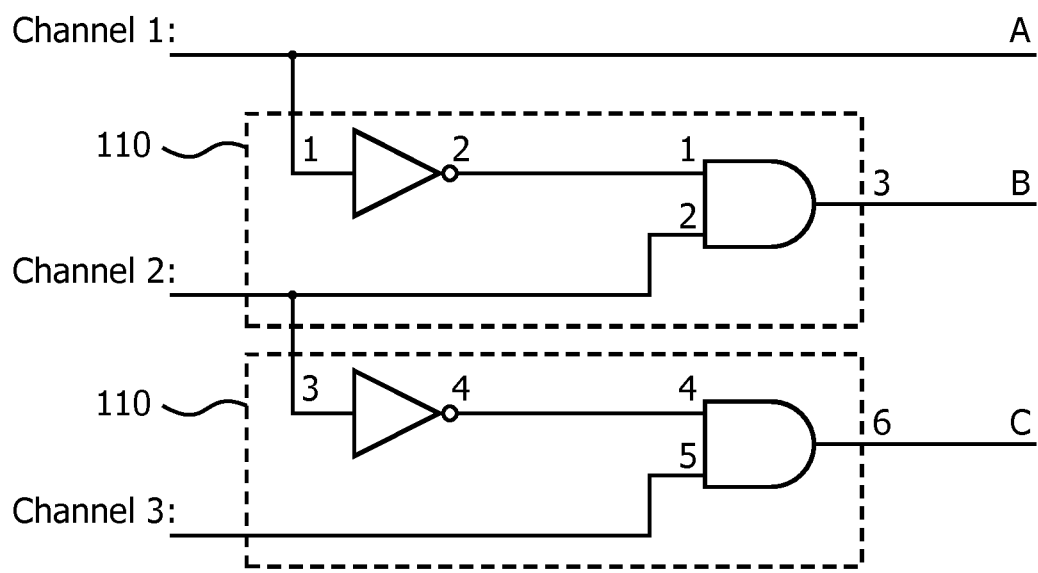
FIG. 11 shows the logic gate arrangement of FIG. 8 to convert the signals of the top part of FIG. 10 into the non-overlapping timing signals of the bottom part of FIG. 10.

FIG. 11 shows an example of logic circuit arrangement which can generate the lower three plots in FIG. 10 from the upper three plots. The logic circuit arrangement comprises two AND gates and two NOT gates. The function implemented is:

A=channel 1;
B=NOT(channel 1) AND channel 2
C=NOT(channel 2) AND channel 3

The logic circuit arrangement thus passes the first lighting channel, but for each other lighting channel there is a logic circuit 110, comprising:

a first input for receiving a signal corresponding to a first duration which relates to the preceding light source in the sequence;

a second input for receiving a signal corresponding to a second duration to be triggered by the end of the first duration which relates to the light source signal being generated;

a logic operation module (the NOT gate and AND gate) for calculating a logic result based on the signals corresponding to the first duration and the second duration, which is the logic AND between the signal corresponding to the second duration and an inversion of the signal corresponding to the first duration. Such logic circuits 110 generate the channels B and C.

These desired non-overlapping signals, output to the driver, generated by this logic circuit are shown as the lower three plots in FIG. 10. Signal A is for LED 10, signal B is for LED 11 and signal C is for LED 12.

The logic circuit arrangement thus implements the detection of trailing edges and uses these as timing triggers for the generation of the lighting pulses. This imposes very little additional overhead to the controller.

It can be seen that the use of a circuit means that the initial channel information is in the form of timing waveforms for each light source which start at the same time, so they can be generated in a simple manner, without requiring specific clock timing. No separate control channel is needed when the blank control period is after all the lighting durations, as in FIG. 10. However, control channels can also be used for input into the logic arrangement in order to provide distributed control periods as in FIG. 6.

The invention has been tested, and has been found to reduce the total power of an example of AC-DC driver from 45 W to 25 W. The total space of the AC-DC driver can then be reduced by about 30% together with a total 15% cost reduction for the drivers. In additional, the total applicable power for the individual LEDs was at the same time increased from 15 W to 30 W.

In the above embodiment, there are multiple drivers each of which connects and drives one LED channel/segment, and these drivers are controlled by the controller to operate in the non-overlapping/complementary way. The following embodiment gives another embodiment in which only one driver is needed.

Figure 12:
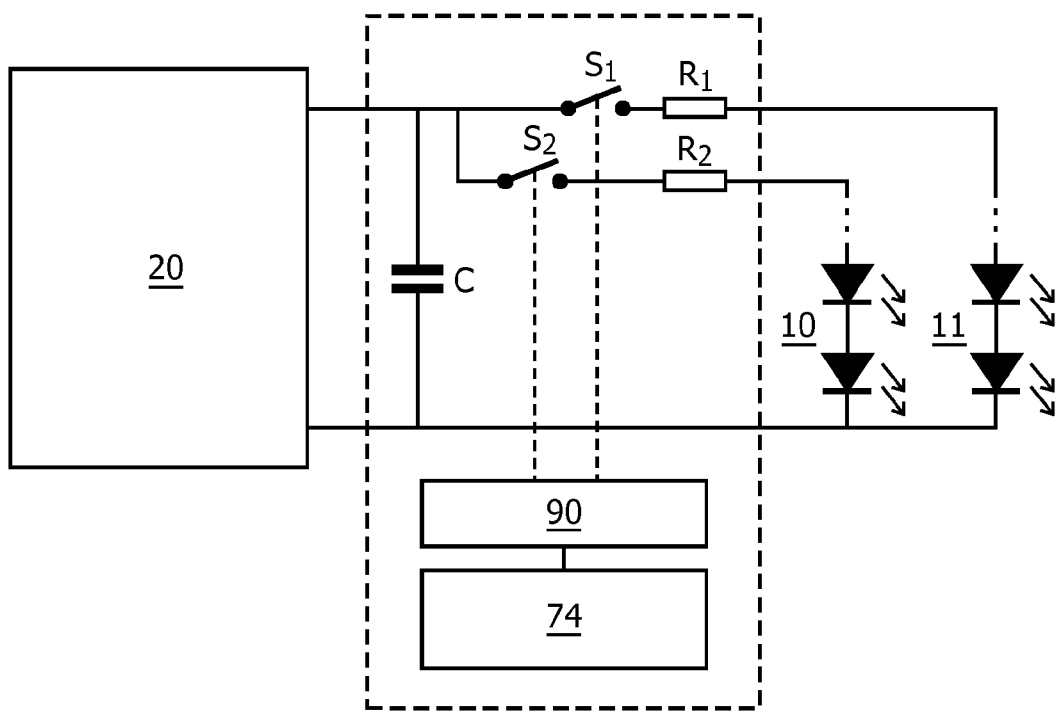
FIG. 12 shows a block diagram of an alternative embodiment of the invention.

As shown in FIG. 12, the lighting system comprises one single driver 20 such a constant current source/driver, and a set of switches. In this embodiment there are two switches S1 and S2. The input of each switch is coupled to the driver 20 and the output of each switch is coupled to one of two light sources 10 and 11 respectively. The set of switches S1 and S2 is controlled by a controller 90 similar as discussed above, and the switches are controlled to be conductive in the non-overlapping sequence. It should be clear that in practice also more than two LEDs can and will be used to make an LED string. Also it is possible that multiple strings in parallel or various series-parallel configurations of LED can be used behind the switches S1 and S2. For simplicity we will however discuss only the simple case of a LED string that consists of a single series-connection of LEDs.

The specific implementation of the controller 90 is similar as above, thus the description will not give unnecessary description.

Figure 13:
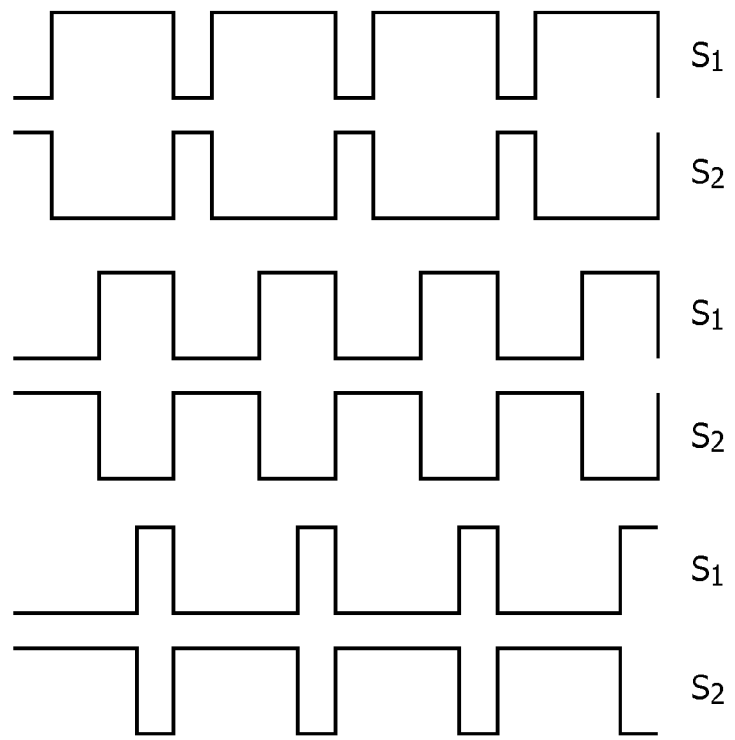
FIG. 13 shows several sets of control signal provided to the two switches in the embodiment of the FIG. 12.

What is to be noted is there is an adjustment interface 74 which is adapted to receive the hue/color temperature adjusting command. Such control interface may be a DALI interface or a Zigbee wireless interface. The controller 90 obtains the desired hue/color temperature and calculates the proper duty cycles of these light sources 10 and 11. Alternatively, the exact duty cycles to be applied can either be configured by means of jumpers, configurable resistors, near field communication, DIP switches or other means to set a static setting. Then the controller 90 controls the corresponding switches S1 and S2 to be conductive complementary/non-overlapping for its corresponding duration. FIG. 13 shows three sets of controlling signal to the switches S1 and S2. In the first set, S1 is ON for a longer duration than that of S2. In the second set, S1 and S2 are ON for a substantially same duration. In the third set, S1 is ON for a shorter duration than that of S2. In case of setting the light sources 10 and 11 emitting light of difference color temperature, these three set of control signal essentially obtain the same lumen output but different overall color temperatures.

In case of dimming, alternatively, this embodiment may control the driver 20 via DALI protocol (IEC 62386) or 1-10V protocol (IEC 60929-E), and lowers the current it provides.

Preferably, if the different switches do not exactly react at the same time the situation may occur that for a short period of time no current is flowing to an LED string or to more than one LED string. To counter the current spikes that might be the result of this, as shown in FIG. 12, a capacitor C may be present in the circuit at the output of the driver before the set of switches, which capacitor can buffer any current imbalances during these periods.

Preferably, if the total voltage over the two strings is not entirely equal this might lead to a small current peak directly after the moment that the current is diverted from one string to the other. To avoid that this peak becomes too large happens, as shown in FIG. 13, resistors R1 and R2 may be added in series with the switch and the light source to reduce this effect.

In implementation, the set of switches with the controller and the adjustment interface can be integrated as a separate module different from the driver, such as being implemented as an add-on box, which does not change the current driver and saves a lot.

The invention can be applied into all types of multi-channel light system which requires at least two channels to drive the light sources, such as for colour mixing or for correlated colour temperature (CCT) light sources.

The system makes use of a lighting controller. Components that may be employed for the controller include, but are not limited to, conventional microprocessors, application specific integrated circuits (ASICs), microcontrollers (MCUs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A lighting controller for controlling a lighting arrangement comprising a set of at least two light sources, the controller comprising:
a timing unit for controlling the timing of operation of the light sources in a repeating non-overlapping sequence, wherein the timing unit is adapted to switch on each light source for a respective lighting duration,
wherein the timing unit comprises a detection subunit adapted to detect the end of the lighting duration for one light source and the timing unit is adapted to use the detected end of the lighting duration as a timing trigger for switching on the next light source in the sequence;
wherein the controller further comprises an adjustment interface, adapted to receive information about lengths of the durations, and wherein the controller is adapted to independently and individually configure each of the durations according to the received information.

2. A controller as claimed in claim 1, wherein the timing unit is adapted to generate a control duration in response to a timing trigger at the detected end of the lighting duration for each of at least one of the light sources, the detection subunit is further adapted to detect the end of the control duration, and the timing unit is further adapted to switch on the next light source in the sequence in response to the detected end of the control duration which thereby functions as a further timing trigger, and
the lighting durations for the light sources and the control duration or durations together cover each period of time during which the lighting arrangement is controlled;
wherein the control duration is a blank channel which does not result in any light output.

3. A controller as claimed in claim 2, wherein:
the controller is a controller adapted to provide the lighting durations for at least two light sources in succession, and to generate the control duration in response to a timing trigger at the end of the successive lighting durations for the at least two light sources.

4. A controller as claimed in claim 2, wherein:
the controller is a controller adapted to trigger a respective control duration at the end of the lighting duration for each of the light sources.

5. A controller as claimed in claim 1, wherein the timing unit comprises:
a first processor adapted to generate respective output signals for each of the durations,
wherein the first processor is further adapted to detect the trailing edge of one output signal corresponding to a first duration and, when the trailing edge is detected, to trigger another output signal corresponding to a second duration succeeding the first duration in the sequence.

6. A controller as claimed in claim 1, wherein the timing unit comprises:
a second processor adapted to generate output signals for each of the lighting durations, wherein the output signals are on simultaneously but off at the end of the respective lighting durations;
a set of one or more logic circuits, each circuit comprising:
a first input for receiving a signal corresponding to a first duration from a corresponding output of the second processor;
a second input for receiving a signal corresponding to a second duration to be triggered by the end of the first duration from a corresponding output of the second processor, wherein at least said second duration is a lighting duration;
a logic operation module for calculating a logic result based on the signals corresponding to the first duration and the second duration, said logic result comprising the logic AND between the signal corresponding to the second duration and an inversion of the signal corresponding to the first duration; and
an output for outputting said logic result as control signal to a corresponding one of the light sources.

7. A lighting system comprising:
a lighting arrangement comprising a set of light sources; and
a controller as claimed in claim 1 for controlling the lighting arrangement.

8. A lighting system as claimed in claim 7, wherein said lighting arrangement comprises respective drivers, each of which being adapted to drive one of said set of light sources respectively, and wherein said controller is adapted to provide commands to the respective drivers to control the operation of the LED loads; or
said lighting arrangement comprises
a driver;
a set of at least two switches, wherein the input of each switch is coupled to said driver and the output of each switch is coupled to one of said set of light sources respectively, and said set of switches is controlled by said controller to be conductive in the non-overlapping sequence.

9. A lighting system as claimed in claim 8, wherein the single driver further comprises an interface for receiving dimming signal based on a dimming protocol comprising 1-10V or DALI.

10. A system as claimed in claim 7, wherein the lighting arrangement comprises a set of three light sources giving different colour outputs, wherein the light sources each comprise an LED arrangement.

11. A method of controlling a lighting arrangement comprising a set of at least two light sources, the method comprising:
switching on each light source for a respective lighting duration in a repeating non-overlapping sequence; and
detecting the end of the lighting duration for one light source and using the detected end of the lighting duration for one light source as a timing trigger for switching on the next light source in the sequence;
further comprising:
receiving information about lengths of the durations, and independently and individually configuring each of the durations according to the received information.

12. A method as claimed in claim 11, wherein at the end of the lighting duration for one light source, the next light source in the sequence is switched on, such that the lighting durations together cover each period of time during which the lighting arrangement is controlled.

13. A method as claimed in claim 11, wherein at the detected end of the lighting duration for each of at least one of the light sources, a control duration is triggered on by the detected end of the lighting duration for said at least one light source before the next light source in the sequence is switched on, and the method further comprises detecting the end of the control duration and using the detected end of the control duration as a timing trigger for switching on the next light source in the sequence, and
the lighting durations for the light sources and the control duration or durations together cover each period of time during which the lighting arrangement is controlled;

wherein the control duration is a blank channel which does not result in any light output.

14. A method as claimed in claim 13, wherein:
the lighting durations for at least two light sources are in succession, and the control duration is triggered at the detected end of the successive lighting durations of the at least two light sources.

15. A method as claimed in claim 12, wherein:
a respective control duration is triggered at the detected end of the lighting duration for each of the light sources.

* * * * *